United States Patent
Kim

(10) Patent No.: US 6,823,014 B2
(45) Date of Patent: Nov. 23, 2004

(54) VIDEO DECODER WITH DOWN CONVERSION FUNCTION AND METHOD FOR DECODING VIDEO SIGNAL

(75) Inventor: Eung Tae Kim, Seoul (KR)

(73) Assignee: LG Electronics Inc., Seoul (KR)

(*) Notice: Subject to any disclaimer, the term of this patent is extended or adjusted under 35 U.S.C. 154(b) by 519 days.

(21) Appl. No.: 09/911,607

(22) Filed: Jul. 25, 2001

(65) Prior Publication Data

US 2002/0037053 A1 Mar. 28, 2002

(30) Foreign Application Priority Data

Jul. 27, 2000 (KR) .......................................... 2000-43520

(51) Int. Cl.[7] .............................................. H04N 7/12
(52) U.S. Cl. ................................................ 375/240.21
(58) Field of Search .......................... 375/240, 240.02, 375/240.08, 240.12–240.17, 240.21, 240.24, 240.25; H04N 7/12

(56) References Cited

U.S. PATENT DOCUMENTS

| 5,262,854 A | * | 11/1993 | Ng ........................ 375/240.24 |
| 5,644,361 A | * | 7/1997 | Ran et al. ............... 375/240.16 |
| 6,061,402 A | * | 5/2000 | Boyce et al. ............. 375/240 |
| 6,233,277 B1 | * | 5/2001 | Ozcelik et al. ......... 375/240.02 |
| 6,310,919 B1 | * | 10/2001 | Florencio ............... 375/240.16 |
| 6,442,201 B2 | * | 8/2002 | Choi ...................... 375/240.12 |
| 6,487,248 B1 | * | 11/2002 | Lim et al. ............... 375/240.12 |
| 6,584,154 B1 | * | 6/2003 | Wu ......................... 375/240.21 |
| 6,628,714 B1 | * | 9/2003 | Fimoff et al. ........... 375/240.16 |

* cited by examiner

*Primary Examiner*—Richard Lee
(74) *Attorney, Agent, or Firm*—Fleshner & Kim, LLP

(57) ABSTRACT

A video decoder decodes a video signal based on a down conversion function. The video decoder includes a variable length decoder which analyzes a received compressed video stream and extracts motion signals. The analyzed bitstream is converted into a macro block through an inverse quantizer and inverse discrete cosine transform unit in succession, and a motion compensator compensates up-sampled data using the extracted motion signals. Data from the IDCT and data from the motion compensator are added, down-sampled by an adaptive down sampler, and stored in an external memory. For motion compensation, the adaptive up-sampler up samples the data down-sampled at the adaptive down sampler, and the result is provided to the motion compensator.

11 Claims, 13 Drawing Sheets

FIG. 12
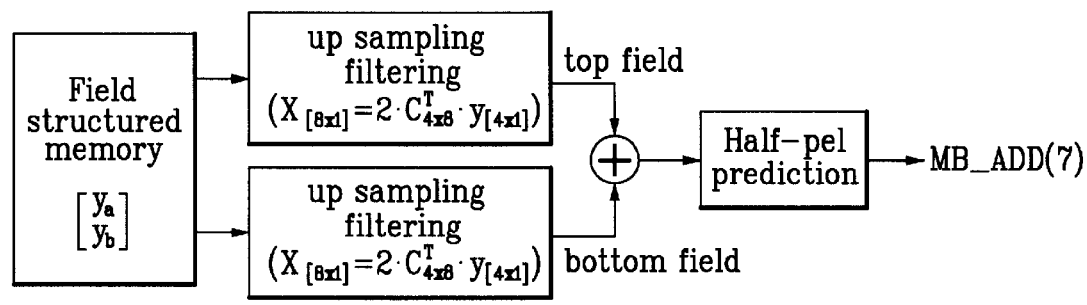
luminance
chrominance
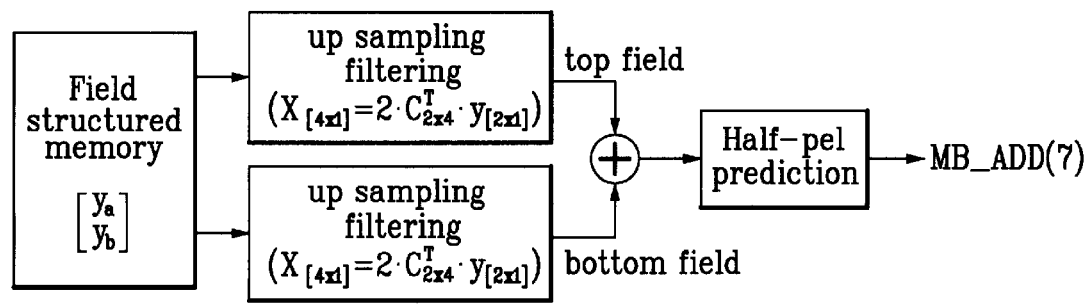

a macro block in a reduced
resolution memory motion compensated
up sampled macro block a macro block in a perfect
resolution memory

VIDEO DECODER WITH DOWN CONVERSION FUNCTION AND METHOD FOR DECODING VIDEO SIGNAL

BACKGROUND OF THE INVENTION

1. Field of the Invention

The present invention relates to a video decoder with a down conversion function, and a method for decoding a video signal.

2. Background of the Related Art

In general, an MPEG-2 video decoding chip is provided with a TP (Transport Packet)-decoder, a video decoder, a video display processor, an external memory, and a host interface, and the like. The external memory may be a DRAM (Dynamic Random Access Memory) for receiving, and storing a bitstream, and frame buffers for motion compensation, and the like. MPEG-2 standard requires a bit buffer size of 16 Mbits for supporting an MP@HL mode, at a maximum allowable bit rate of 80 Mbits/s. An existing 16 Mbits DRAM basis MPEG-2 decoder requires an external memory of approx. 96~128 Mbits size. Therefore, a price competitiveness is required in view of manufacturers and consumers. For having the price competitiveness, it is required that a good picture quality is maintained while expensive memory sizes are reduced. However, it is foreseen that an increase of additional external memories is inevitable in the future in light of a trend that various OSD (On Screen Display) and a variety of services are provided.

Recently, in a case of a video compression and decoding system such as MPEG-2, a variety of video signals are multi-decoded and displayed, for providing a variety of services, when it is required that the variety of video signal are decoded by using a limited capacity of the memory. At the end, taking the memory size limitation, price, and a bandwidth of a data bus into account, the video decoding chip is required to be provided with an effective device for reducing a memory capacity that can minimize a loss of a high quality picture signal loss.

In memory reduction algorithms loaded on existing video decoding chips, there are the ADPCM (Adaptive Differential Pulse Coded Modulation) type with a 50% reduction ratio, and the type with 75% reduction ratio that eliminates spatial duplicity by using VQ (Vector Quantization).

The ADPCM is suggested by Pau and Sano in EP 0778709A1 titled "MPEG-2 decoding with a reduced RAM requisite by ADPCM recompression before storing MPEG decompressed data". The VQ is suggested by Bruni et al. in IEEE Trans., On Customer Electronics, pp. 537–544, 1988, titled "A novel adaptive vector quantization method for memory reduction in MPEG-2 HDTV decoders".

Compression methods by filtering in a DCT (Discrete Cosine Transformation) frequency domain, or down sampling are suggested by S.-B. Ng ("Lower resolution HDTV receivers", U.S. Pat. No. 5,362,854, Nov. 16, 1993), S.-J. Choi et al. ("Frame memory reduction for MPEG-2/DTV video coding", Int. workshop on HDTV '98), and R. Mokry and D. Anastassiou ("Minimul error drift in Frequency scalability for motion-compensated DCT coding", IEEE Trans. On Circuits and Systems for Video Tech., Vol. 4, August 1994).

Because a compressed code is stored in the memory, the ADPCM method is difficult to display a video by using a video display right away, to require a device for decoding the compressed code, additionally. Since the ADPCM method shows very great picture quality loss in a case of 75% reduction, the ADPCM method is not suitable for the video decoding chip.

Different from this, a plurality of HDTV class videos or SD class videos received at one chip video decoder can be displayed on one screen simultaneously by using a down conversion algorithm. This method can maintain a good picture quality to some extent despite of substantial reduction of the memory capacity, and applicable to inexpensive decoders for low resolution displays. Therefore, a down conversion algorithm that allows to employ a small capacity memory while a good picture quality can be maintained, and a hardware design for the down conversion algorithm, are required.

A general MPEG encoder encodes either a progressive sequence or an interlaced sequence. An interlaced sequence picture is encoded in field or frame units. The field picture has odd scanning lines and even scanning lines, and all encoder and decoder are operative in field. Therefore, data blocks each DCT Transformed in a 8×8 unit only has odd fields or even fields, which are called as field DCT coded blocks.

Different from this, a frame picture has odd scanning lines and even scanning lines, resulting in macro blocks of the frame picture to have odd fields and even fields. However, macro blocks of the frame picture can be coded in two methods. According to the first method, each of the four 8×8 discrete cosine transformed blocks is a DCT coded block in frame units each having odd scanning lines and even scanning lines. On the other hand, according to the second method, two macro blocks from the four macro blocks are blocks DCT coded in field units only having odd scanning lines of the macro blocks, and the rest of two macro blocks are blocks DCT coded in field units only having even scanning lines.

All the macro block in the field picture are DCT coded in field units, and motion compensation of which are predicted from a reference field in making motion compensation. On the other hand, macro blocks in the frame picture are DCT coded in frame units or in field units. Each of the macro blocks in the frame picture is motion compensation predicted in frame units or field units. On the other hand, in a case of the progressive sequence, all pictures are DCT coded, and motion compensation predicted in frame units.

Currently, in this state spread of HD displays are not enough, there are many cases when an HD class picture quality video sequence is displayed in a lower resolution through TV receivers of present NTSC (National Television System Committee) standards. Therefore, it is required that users can watch an HDTV broadcasting signal through the NTSC TV receivers without buying expensive HDTV (High Definition Television), immediately. As explained, a device for converting the HDTV broadcasting signal suitable to the NTSC TV receiver is called as a down converting decoder. At the end, by employing the down converting decoder, a TV receiver having a price significantly lower than a TV receiver having a perfect HD class resolution can be obtained.

One of these types is disclosed in U.S. Pat. No. 5,262,854. This patent includes a down sampler for removing 48 high frequency DCT coefficients in an 8×8 block. According to this patent, a result of IDCT for the rest low frequency 4×4 blocks is stored in a memory. Therefore, for making an accurate motion compensation, when it is intended to reduce an error of motion compensation prediction by using perfect resolution motion vectors, a frame of reduced resolution is used as reference. At the end, in order to provide a picture of a perfect resolution from a picture of a reduced resolution, an up-sampling is employed.

A few effective methods are suggested for reducing the error of motion compensation prediction by up sampling a picture down sampled by using 4×4 IDCT, by R. Monky and D. Anastsssiou ("Minimul error drift in frequency scalability for motion-compensated DCT coding", IEEE Trans. On circuits and systems for video Tech., Vol. 4, No. 4, August 1994), and Johnson and Princen ("Drift minimization in frequency scaleable coders using block based filtering", IEEE workshop on visual signal processing and communication, September 1993. These methods employ two dimensional filters each having 5 taps or 8 taps depending on a typically predicted motion vector of a macro block, when positions of 8 tap filter values are changed depending on the motion vector, to require to increase 4 pels into 8 pels by one 8 tap filter.

However, while the foregoing methods are suitable to a progressive sequence having DCT coded blocks in frame units, matters on a video of blocks DCT coded in frame units and DCT coded in field units mixed therein are not taken into account. Moreover, the foregoing methods have a frame type memory structure, a down converting of blocks DCT coded in field units is carried out after the blocks DCT coded in field units is converted into blocks DCT coded in frame units, that results in unfavorable influence of prediction error accumulation in making motion compensation in an area having a great motion. Furthermore, the only employment of low frequency parts (in general, called as 4×4 cuts) among 8×8 DCT coefficients in the motion compensation causes to lost signals of high frequency band, that causes to occur block artifacts.

Eventually, an interlaced sequence processed at an MPEG-2 video decoder has a problem of data loss occurred in the down conversion.

SUMMARY OF THE INVENTION

Accordingly, the present invention is directed to a video decoder with a down conversion function, and a method for decoding a video signal that substantially obviates one or more of the problems due to limitations and disadvantages of the related art.

An object of the present invention is to provide a video decoder with a down conversion function, and a method for decoding a video signal which permits an SD class display of a small memory capacity to display an HD class signal.

Another object of the present invention is to provide a video decoder with a down conversion function, and a method for decoding a video signal which permits to reduce different video signals in 1/2, or 3/4 reduction ratio, and store in an external memory at a time, or display on one screen at a time, regardless of a progressive scanning type picture or interlaced scanning type picture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, and according to a first characteristic of the present invention, frame DCT coded blocks and field DCT coded block received at the video decoder are always down converted into a picture of a field basis vertical pel structure.

According to a second characteristic of the present invention, a macro block adder module adds a motion compensated macro block from a motion compensation buffer and an IDCT macro block from a DCT buffer according to a picture structure and a DCT type. In a 75% reduction mode, a device is included for arranging positions of pels of a block predicted as a field structure to suit to an IDCT type.

According to a third characteristic of the present invention, a down sampler module has modes for horizontal 1/2 reduction in 8×8 block units, and for vertical and horizontal 3/4 reductions.

According to a four characteristic of the present invention, a down sampler module divides a frame DCT coded block into field signals and extracts frequency components in a 8×8 block in a 3/4 reduction mode. In this instance, different down sampling filters are used in a vertical down sampling depending on a color component, because a number of fields for chrominance components are smaller than a number of fields for luminance components.

According to a fifth characteristic of the present invention, in a down sampling, down sampled pels are obtained by a down sampling matrix conversion. That is, $C_{4 \times 8} = C_4^T \cdot T_8$, where $$C4 = \frac{\begin{bmatrix} T_4 \\ \phi \end{bmatrix}}{\sqrt{2}},$$

and $T_4$ denotes a 4×4 DCT basis matrix, except that $C_{2 \times 4} = C_2^T \cdot T_4$ filter is used in vertical down sampling of a chrominance component.

According to a sixth characteristic of the present invention, in motion compensation, a field fit to a motion vector is selected, and reads a reduced field reference signal on a memory. Then, horizontal and vertical direction up sampling are carried out for each fields.

According to a seventh characteristic of the present invention, in field prediction compensation, a reference address is provided to a memory by using a motion vector to read a reference block. Then, horizontal and vertical up sampling is carried out for each filed, a 1/2 pel prediction is made for the up sampled blocks, to provide motion compensated blocks. Finally, the motion compensated blocks are forwarded to a macro block adder in field units.

According to an eighth characteristic of the present invention, in frame prediction compensation, a reference address is provided to a memory by using a motion vector, to read field unit reference blocks. Then, horizontal and vertical up sampling is carried out for each field, and a frame unit reference block is formed of up sampled blocks of each field. Then, a motion compensated block is formed by making 1/2 pel prediction. Finally, motion compensated frame unit blocks are forwarded to a macro block adder according to IDCT macro block type.

According to a ninth characteristic of the present invention, an up sampler module has a 1/2 reduction mode in which a horizontal up sampling in 8×4 block units is made, and a 3/4 reduction mode in which vertical and horizontal up sampling in 4×4 block units are made.

According to a tenth characteristic of the present invention, a motion compensator uses $2 \cdot C_{4 \times 8}^T$, and $2 \cdot C_{2 \times 4}^T$ filters in up sampling in filtering.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 12 illustrates a block diagram showing a process for up sampling field data stored in a field basis external memory by means of frame prediction; and, FIG. 13 illustrates a diagram for explaining a method for making motion compensation having 1/2 pel interpolation of the present invention.

DETAILED DESCRIPTION OF THE PREFERRED EMBODIMENT

Reference will now be made in detail to the preferred embodiments of the present invention, examples of which are illustrated in the accompanying drawings. The video decoder with a down conversion function of present invention relates to a technology required for displaying interlaced scanning, coded, different video signals of HD class on the same screen on the same time, or displaying an HD class signal on a low resolution class display. The video decoder of the present invention can reduce a capacity of an external memory by 50% or 75% compared to an existing HD class video decoder as required, and is applicable to an MPEG-2 (Moving Picture Expert Group-2) decoding chip, a standard in a digital video signal transmission field.

Figure 1:
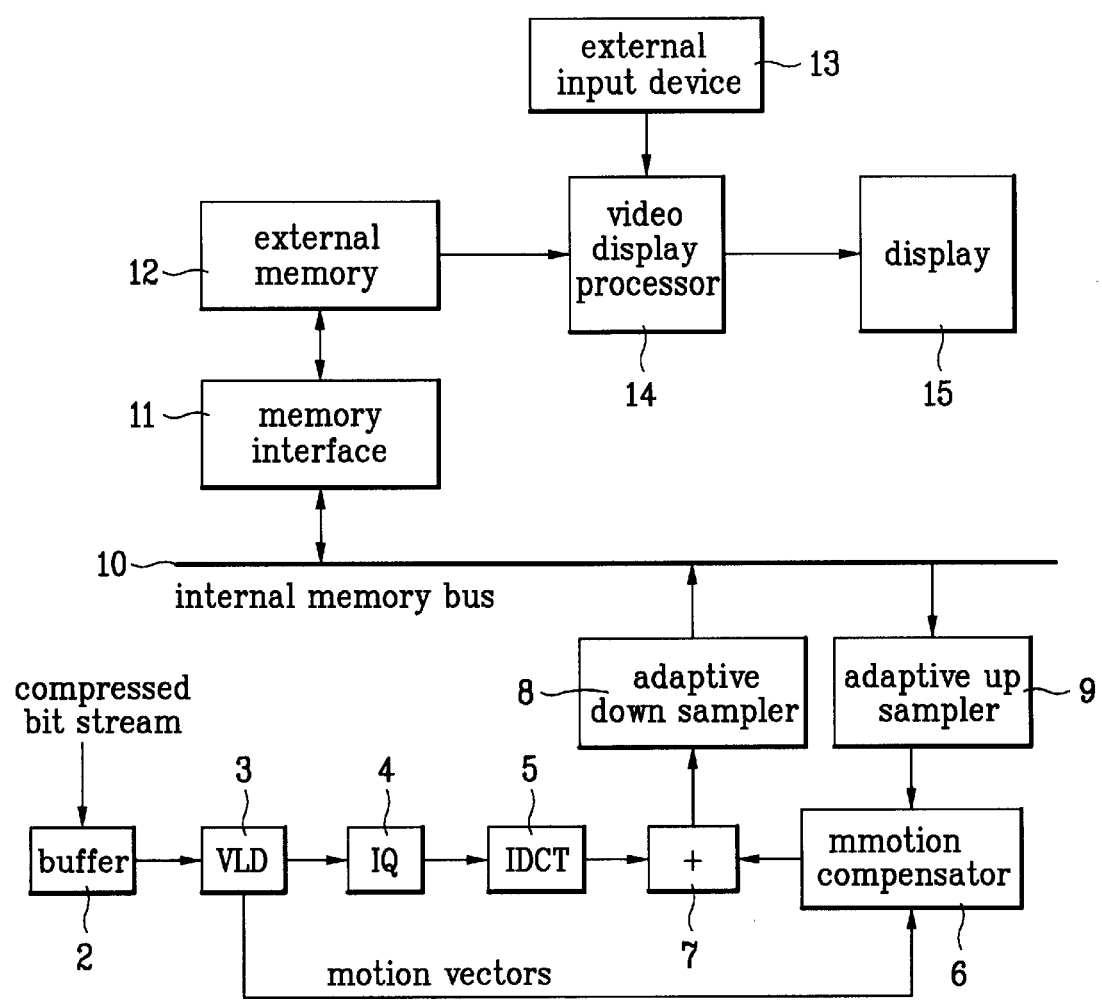
FIG. 1 illustrates a block diagram showing a system of a scaleable MPEG-2 video decoder having a down conversion function in accordance with a preferred embodiment of the present invention.

As explained, the MPEG-2 video decoder of the present invention reduces a video, and stores in a memory or displays on a screen, regardless of a progressive scanning type picture or an interlaced scanning type picture. FIG. 1 illustrates a block diagram showing a system of a scaleable MPEG-2 video decoder having a down conversion function in accordance with a preferred embodiment of the present invention. The down conversion function of the system in FIG. 1 is for 50% or 75% memory reduction.

Referring to FIG. 1, the scaleable MPEG-2 video decoder having a down conversion function in accordance with a preferred embodiment of the present invention includes a buffer 2 for receiving a compressed bitstream 1, a VLD (Variable Length Decoder) 3 for analyzing the compressed bitstream from the buffer 2, an IQ (Inverse Quantizer) 4 for inverse quantizing the compressed bitstream analyzed at the VLD 3, an IDCT for inverse discrete cosine transform of the bitstream from the IQ 4, an MC (Motion Compensator) 6 for making motion compensation of a data up sampled by motion signals, such as motion vectors, extracted from the VLD 3, an adder 7 for adding a data from the IDCT 5 and a data from the MC 6, an adaptive down sampler 8 for subjecting a data from the adder to adaptive down sampling, and an adaptive up sampler 9 for up sampling the data down sampled at the adaptive down sampler 8, and providing to the MC 6. The signal from the down sampler 8 is stored in an external video frame memory 12 through an internal memory bus 10 and the memory interface 11. The data stored in the memory 12 is processed to be displayable at a video display processor 14 in response to an instruction signal provided from the external input device 13, and displayed on a display 15. In this instance, the MPEG-2 video decoder carries out IDCT in 8×8 block units according to an MPEG-2 video syntax. On the other hand, in a case of an intra-picture (I-picture), the data subjected to IQ and IDCT at the IQ 4 and IDCT 5 is stored in the external memory right away, and, in a case of a predictive picture (P-picture) or a bi-directional picture (B-picture), the data motion compensated at the MC 6 and the data subjected to IDCT at the IDCT 5 are added together at the adder 7 and stored in the external memory 12. As explained, the video stored in the external memory 12 is displayed after the video is passed through the video display processor 14. The present invention is characterized in that the adaptive down sampler 8 and the adaptive up sampler 9 are provided additionally, for storing different video signals, reducing a capacity of the external memory 12, and reducing a bandwidth of the data to be stored in the external memory 12. Both of the adaptive down sampler 8 and the adaptive up sampler 9 reduce a size of a video data to be stored in the external memory 12 by 1/2 or 1/4. Also, the two samplers 8 and 9 reduce a drift error occurred during decoding of the MPEG video data to a maximum and helps to maintain a good display picture quality.

Figure 2:
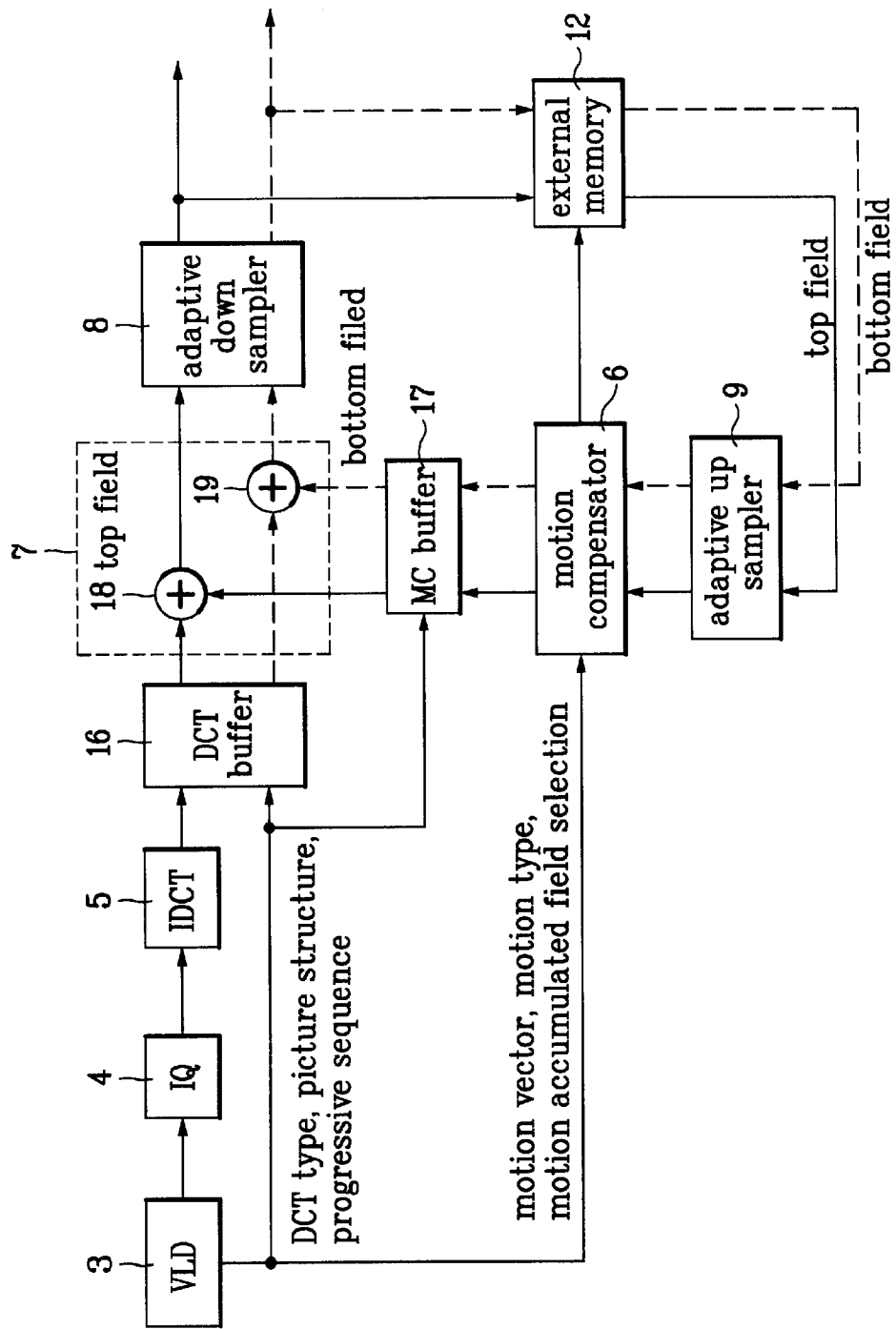
FIG. 2 illustrates a block diagram showing a system of a video decoder having a down conversion algorithm for memory reduction in accordance with a preferred embodiment of the present invention.

FIG. 2 illustrates a block diagram showing a system of a video decoder having a down conversion algorithm for memory reduction in accordance with a preferred embodiment of the present invention.

Referring to FIG. 2, the video decoder having a down conversion algorithm for memory reduction in accordance with a preferred embodiment of the present invention includes a VLD 3 for receiving and analyzing a compressed bitstream, an IQ for subjecting the compressed bitstream analyzed at the VLD 3 to IQ, an IDCT 5 for subjecting a bitstream from the IQ 4 to inverse discrete cosine transform in 8×8 block units, an MC 6 for making motion compensation of an up sampled data by using motion signals extracted by analysis of the VLD 3, i.e., motion vectors, motion type, and a motion vertical field selection signal, a DCT buffer 16 for forwarding a data from the IDCT 5 with the data sorted into a top field data and a bottom field data by using signals extracted at the VLD 3, i.e., a DCT type, a picture architecture, and a progressive sequence signal, an MC buffer 17 for forwarding a data from the motion compensator 6 with the data sorted into a top field data and a bottom field data by using the DCT type, the picture architecture, and the progressive sequence signal, an adder 18 for adding the top field data from the DCT buffer 16 and the top field data from the MC buffer 17, an adder 19 for adding the bottom field data from the DCT buffer 16 and the bottom field data from the MC buffer 17, an adaptive down sampler 8 for subjecting the top field data and the bottom field data from the two adders 18 and 19 to adaptive down sampling, an external memory 12 for storing the down sampled data, i.e., a reduced resolution data and a motion compensated data, and an adaptive up sampler 9 for up sampling the down sampled data stored in the external memory 12 and forwarding to the MC 6.

Figure 3:
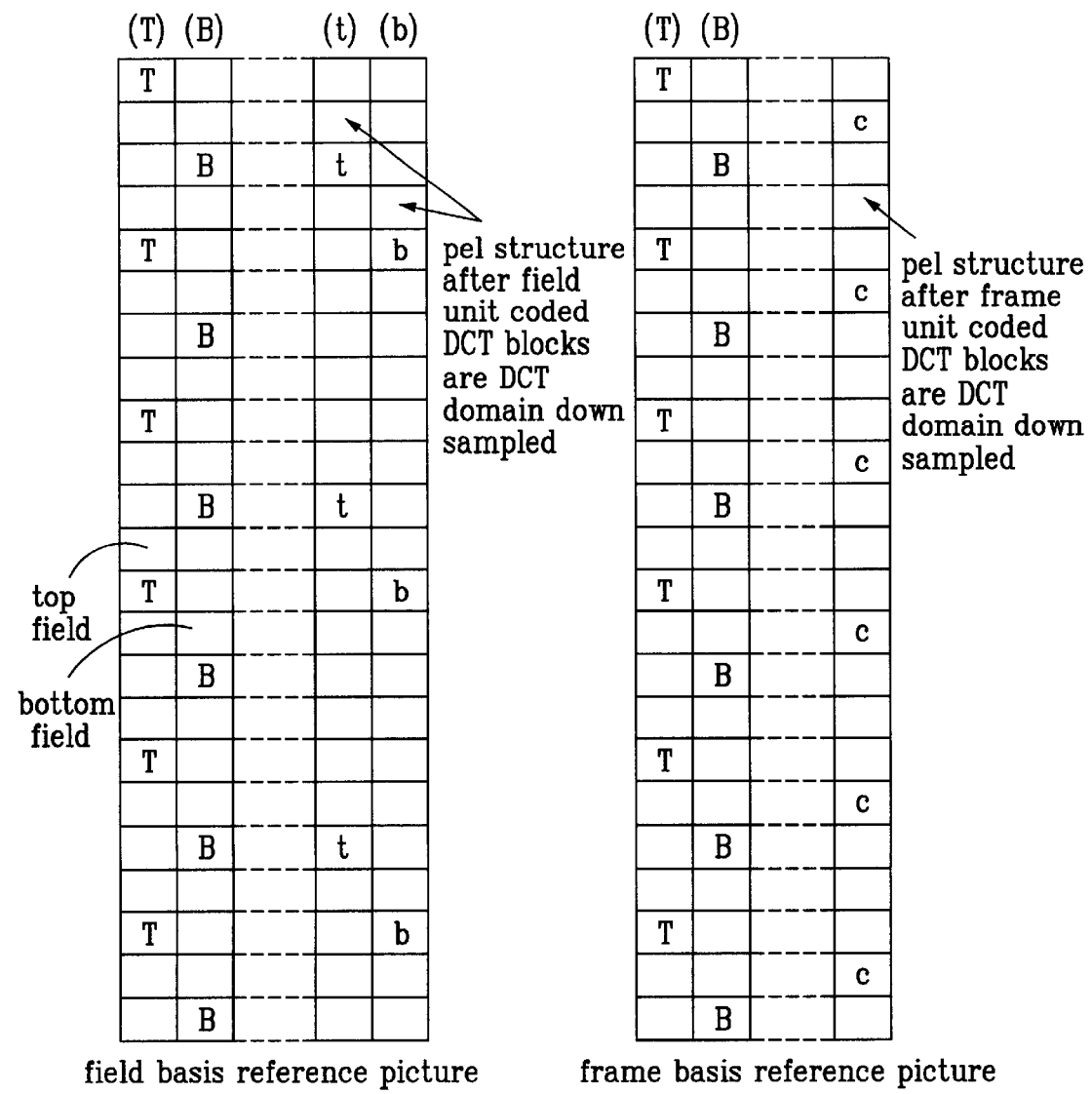
FIG. 3 illustrates a diagram showing a pel architecture after data in DCT domain is down sampled.

In general, the MPEG-2 video decoder reads pels in frame units or field units from the external memory 12 according to architecture frame picture or field picture, and makes motion compensation. However, in the vertical direction down sampling for 75% memory capacity reduction, results of down sampling differ for the frame picture and the field picture. FIG. 3 illustrates a diagram showing a pel architecture after data in DCT domain is down sampled.

Referring to FIG. 3, when a block DCT coded in frame units, and a block DCT coded in field units are down sampled in a DCT transform domain respectively, results thereof show pel architecture different from the other, and, particularly, information on a field kind is lost when a motion compensation is made, or the video data in the interlaced scanning type is displayed in field units. In order to compensate for this, the present invention suggests to store the DCT blocks in the external memory 12 in a vertical pel architecture based on a field fixed already regardless of one DCT block in a received video sequence is a block DCT coded in field units or a block DCT coded in frame units. Thereafter, a compensation for a motion prediction is made. Therefore, even if a frame picture is down sampled in a vertical direction, information on a field kind is not lost, and, furthermore, a good picture quality can be maintained.

The operation of the video decoder in FIG. 2 will be explained.

The DCT coefficients analyzed at the VLD 3 is provided to the IDCT (or a module) 5 after the DCT coefficients are passed through an inverse quantizing process through the IQ 4, when the VLD 3 also provides a signal indicating that the received video signal has a DCT type frame or field, and a signal indicating the received video signal is a frame picture of a picture architecture or a field picture. The VLD 3 also provides the motion vectors MV, a motion type signal motion_type, and a motion vertical field selection signals motion_vertical_field_select. In the meantime, the two adders 18 and 19 in the macro block adder MB_ADD 7 in FIG. 1 add outputs both of the DCT buffer 16 and the MC_buffer 17 to suit to forms of data from the IDCT 5, respectively. Then, data from the adders 18 and 19 are down sampled at the adaptive down sampler 8.

Figure 4:
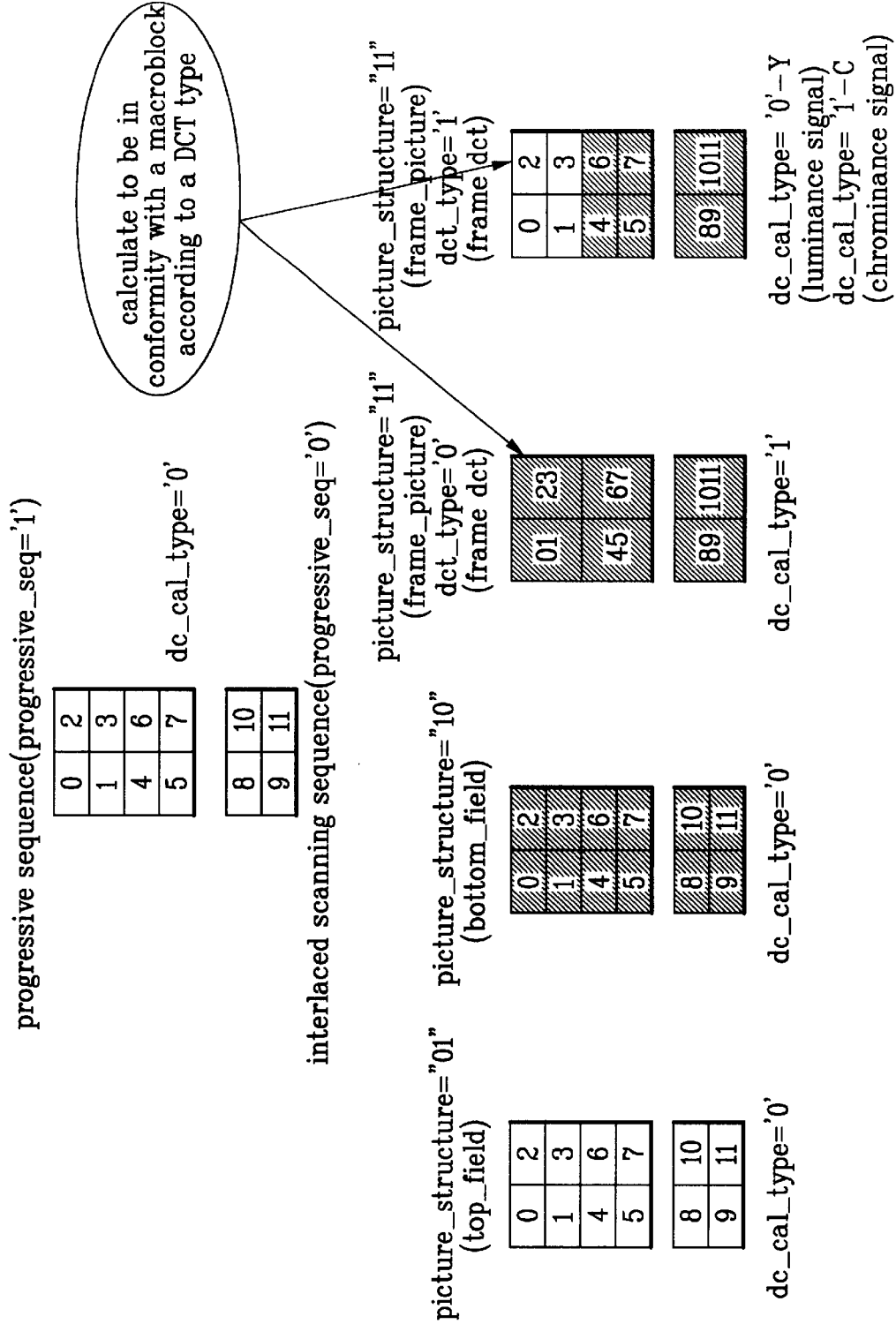
FIG. 4 illustrates a diagram showing a form of data from the IDCT and stored in the DCT buffer.

FIG. 4 illustrates a diagram showing a form of data from the IDCT and stored in the DCT buffer. In a case of an interlaced scanning type frame picture, in a DCT type code dc_cal_type, there are a frame type dct_type='0' and a field type dct_type='1'. When a DCT calculation type code dc_cal_type representing a frame architecture in 8×8 block units is set to be "1", shuffling of data in field units is carried out. In FIG. 4, code progressive_seq='1' represents a progressive scanning sequence, code progressive_seq='0' represents an interlaced scanning sequence, code picture_structure='01' represents a top field, code picture_structure='10' represents a bottom field, code picture_structure='11' represents a frame picture, code dct_type='0' represents a frame DCT, code dct_type='1' represents a field DCT, and code dc_cal_type='0' represent existence of no data.

Figure 5:
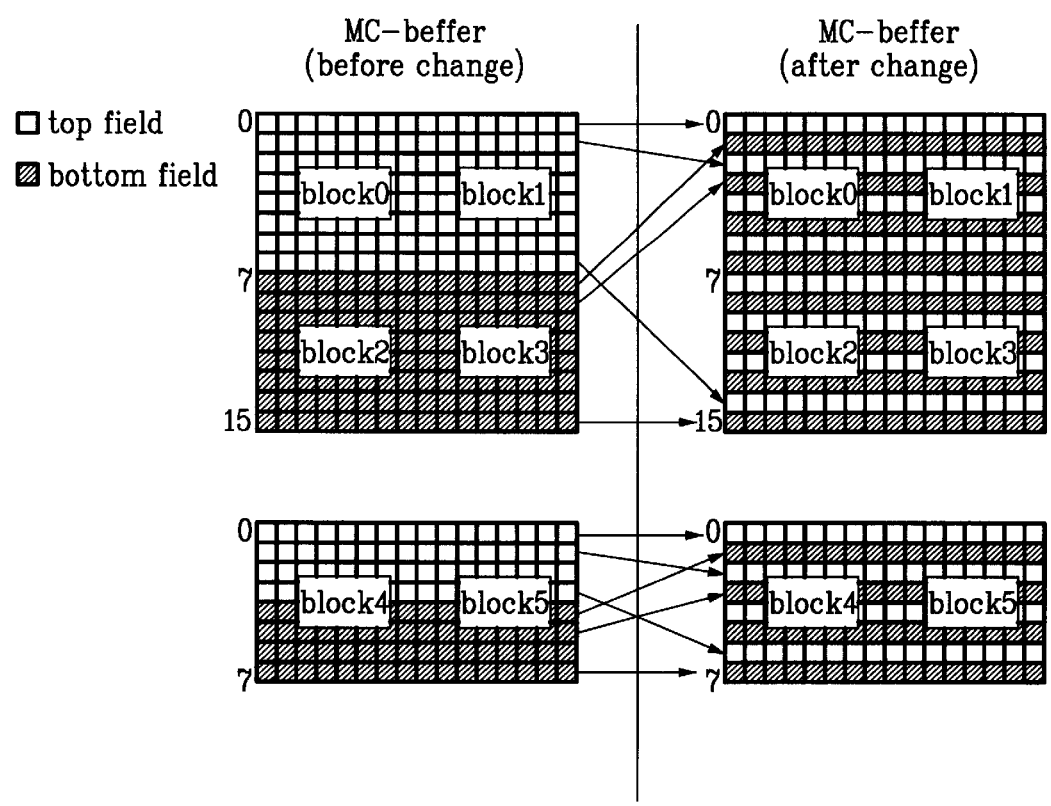
FIG. 5 illustrates a diagram showing a case when an MC buffer converts and stores a field unit picture into a frame unit picture.
Figure 6:
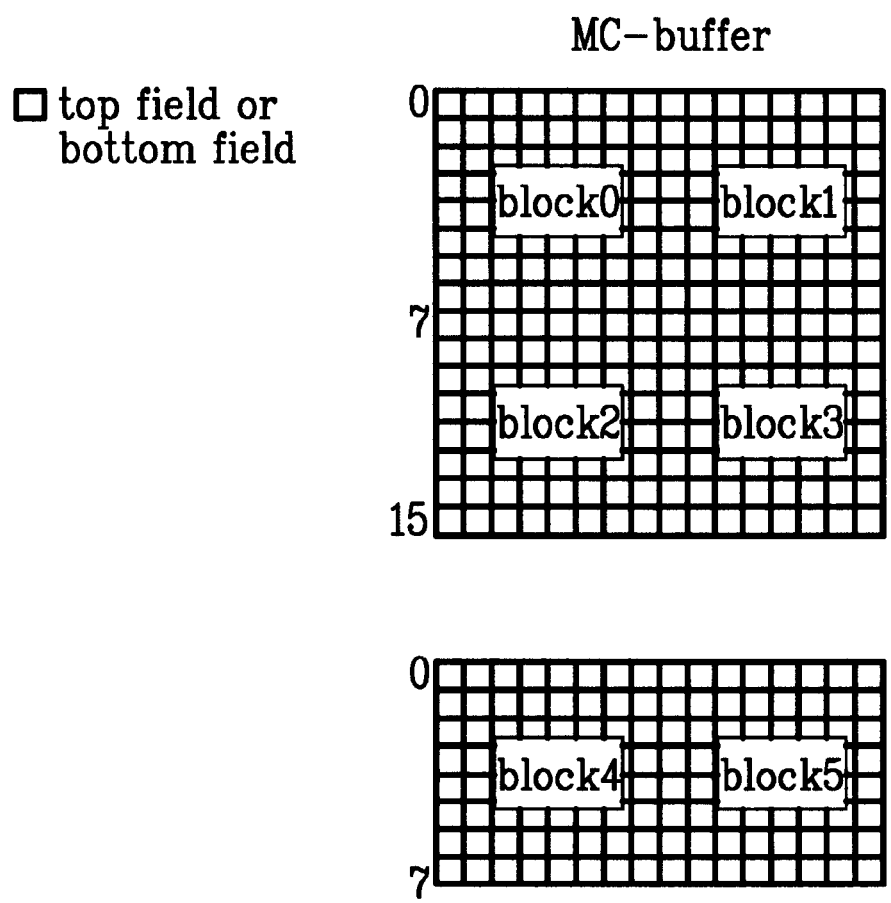
FIG. 6 illustrates a diagram showing a case when an MC buffer stores a field unit picture as it is.

FIG. 5 illustrates a diagram showing a case when an MC buffer converts and stores a field unit picture into a frame unit picture, and FIG. 6 illustrates a diagram showing a case when an MC buffer stores a field unit picture as it is.

Referring to FIGS. 5 and 6, the MC buffer receives, and stores a picture either in a frame structure or in a field structure depending on a picture structure. As explained, the video decoder of the present invention stores a picture data based on the field structure. Therefore, when the video decoder forms a macro block for a motion compensation, the video decoder accesses to the external memory 12 and reads pel values therein in field units. Therefore, in general, in motion compensation for a field picture, the MC_buffer 17 is formed in field units as shown in FIG. 6. However, in frame picture motion compensation types, there are frame unit motion compensation MC-FRAME, and field unit motion compensation MC_FIELD, MC_DMV. At the end, as shown in FIG. 5, in order to obtain a frame structure macro block, pels from the field structure macro block is required to be converted into a frame structure macro block. Finally, a form of the pels stored in the MC_buffer 17 is made suitable to the picture structure provided to the video decoder.

Figure 7:
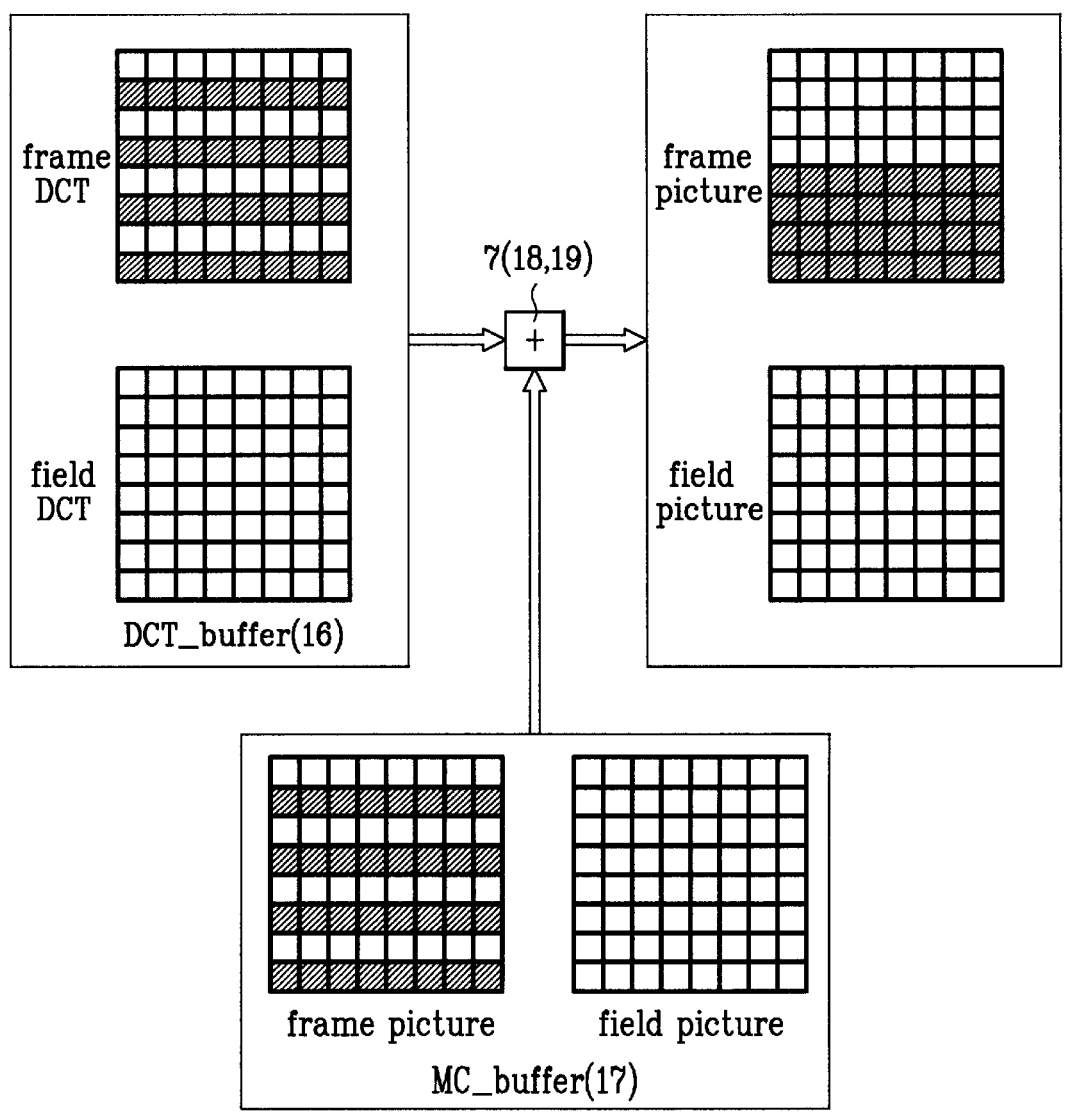
FIG. 7 illustrates a diagram for explaining operation of a macro block adder.

FIG. 7 illustrates a diagram for explaining operation of a macro block adder.

Referring to FIG. 7, the macro block adder 7 adds data from the MC_buffer 17 and the DCT_buffer 16 such that pels at the same positions are added according to the DCT_type and the picture structure.

Figure 8:
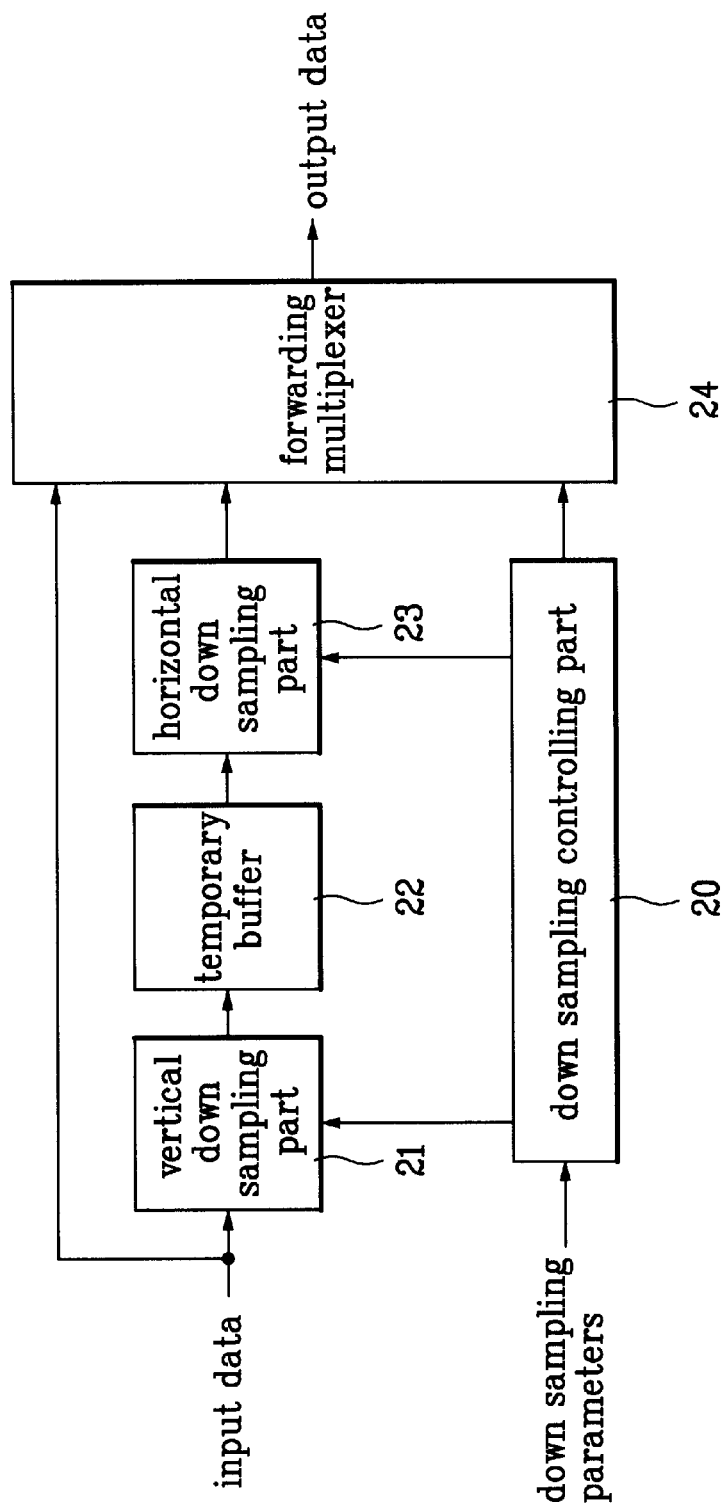
FIG. 8 illustrates a block diagram showing a detailed system of the down sampler in FIG. 2.

FIG. 8 illustrates a block diagram showing a detailed system of the down sampler 8 in FIG. 2.

Referring to FIG. 8, the down sampler 8 includes a down sampling controlling part 20 for controlling down sampling according to received down sampling parameters, a vertical down sampling part for down sampling a received data in a vertical direction under the control of the down sampling controlling part 20, a temporary buffer 22 for temporary storage of the vertical down sampled data, a horizontal down sampling part 23 for down sampling data from the temporary buffer 22 in a horizontal direction under the control of the down sampling controlling part 20, and a forwarding multiplexer 24 for forwarding either of the received data and a data from the horizontal down sampling part 23 selectively under the control of the down sampling controlling part 21. The down sampler 8 reduces sizes of original data according to 1, 1/2, and 3/4 reduction ratios for respective field signals from the macro block adders MB_ADD 18 and 19. To do this, the down sampler 8 includes separate processors for the vertical direction and the horizontal direction. In the 1/2 original data reduction, the down sampler 8 makes a horizontal down sampling only.

The following is a down sampling equation.

$$[X] = \begin{bmatrix} X_0 \\ X_1 \\ X_2 \\ X_3 \\ X_4 \\ X_5 \\ X_6 \\ X_7 \end{bmatrix} = T_8[x], \quad (1)$$

where, [X] denotes 8 DCT coefficients, and [x] denotes 8 pel values.

$$[T8] = \begin{bmatrix} t_{00} & t_{01} & t_{02} & t_{03} & t_{04} & t_{05} & t_{06} & t_{07} \\ t_{10} & t_{11} & t_{12} & t_{13} & t_{14} & t_{15} & t_{16} & t_{17} \\ t_{20} & t_{21} & t_{22} & t_{23} & t_{24} & t_{25} & t_{26} & t_{27} \\ t_{30} & t_{31} & t_{32} & t_{33} & t_{34} & t_{35} & t_{36} & t_{37} \\ t_{40} & t_{41} & t_{42} & t_{43} & t_{44} & t_{45} & t_{46} & t_{47} \\ t_{50} & t_{51} & t_{52} & t_{53} & t_{54} & t_{55} & t_{56} & t_{57} \\ t_{60} & t_{61} & t_{62} & t_{63} & t_{64} & t_{65} & t_{66} & t_{67} \\ t_{70} & t_{71} & t_{72} & t_{73} & t_{74} & t_{75} & t_{76} & t_{77} \end{bmatrix}, \quad (2)$$

where, [T8] represents an 8×8 DCT matrix of 8-point DCT bases.

Similar to equation (2), a 4×4 DCT matrix of 4-point DCT bases is represented with [T4]. A down sampling process of removing high frequency components in the horizontal direction and in the vertical direction, and subjecting to IDCT can be expressed with the following equation.

$$\begin{bmatrix} y \\ y \\ y \\ y \\ 0 \\ 0 \\ 0 \\ 0 \end{bmatrix} = [P4^T] \begin{bmatrix} X_0 \\ X_1 \\ X_2 \\ X_3 \\ X_4 \\ X_5 \\ X_6 \\ X_7 \end{bmatrix}, \quad (3)$$

where, [P4] represents $$[P4] = \frac{\begin{bmatrix} T4 & \phi \\ \phi & \phi \end{bmatrix}}{\sqrt{2}}. \quad (4)$$

At the end, an one dimensional down sampling can be expressed as the following equation (5) by using equations (2) and (3).

$$y_{4\times 1} = C_4^T \cdot X_{8\times 1} = \frac{[T_4^T \phi]}{\sqrt{2}} \cdot [T8] \cdot X_{8\times 1}, \quad (5)$$

where, 'x' represents 8×1 pels, 'y' represents down sampled 4×1 pels, and 'X' represents coefficient blocks subjected to DCT with respect to 'x'. And, $$C_4 = \frac{\begin{bmatrix} T_4 \\ \phi \end{bmatrix}}{\sqrt{2}}.$$

Then, the equation (5) can be expressed in the following equation (6).

$$Y_{4\times 1} = C_{4\times 8} \cdot X_{8\times 1} \quad (6),$$

where, $C_{4\times 8} = C^T_4 \cdot T_8$ is defined as a 4×8 dimension down sampling matrix, which converts 8 pels into 4 pels.

Similar to the equation (6), a down sampling matrix having an input of 4 pels and an output of 2 pels can be represented as the following equation (7).

$$Y_{2\times 1} = C_{2\times 4} \cdot X_{4\times 1} \quad (7),$$

where, $C_{2\times 4}$ represents $$\begin{bmatrix} T_2 \\ \phi \end{bmatrix}^T \cdot \frac{T_4}{\sqrt{2}},$$

and $T_2$ represents a matrix based on 2×2 DCT as shown in the equation (2).

Figure 9:
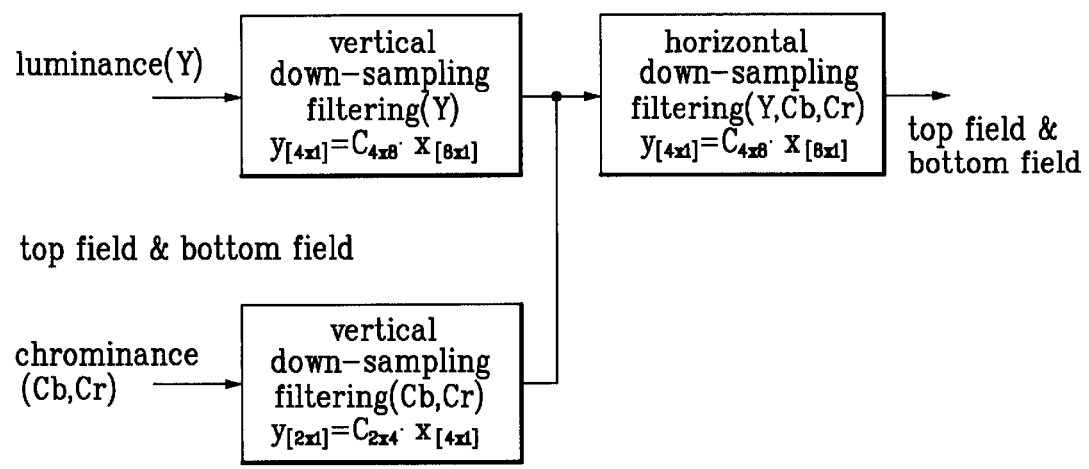
FIG. 9 illustrates a block diagram for explaining operation of the down sampler in FIG. 2.

FIG. 9 illustrates a block diagram for explaining operation of the down sampler in FIG. 2, showing a field basis down sampling by using the equations (6) and (7).

Referring to FIG. 9, in a 50% original data reduction, only a horizontal down sampling is carried out, when an 8×8 field block is converted into an 8×4 field block by using the matrix in the equation (6), and stored in the external memory 12. In 75% original data reduction, it is required to process a luminance signal 'Y' and a chrominance signal 'C' in the original data separately for maintaining information on field in the external memory 12. As shown in FIG. 4, in a case of frame structured picture, the chrominance signal 'C' is divided into a 4×8 sized top field and a 4×8 sized bottom field. Different from the chrominance signal, the luminance signal 'Y' is divided into an 8×8 sized top field and an 8×8 sized bottom field. At the end, since the chrominance signal has a number of vertical direction field lines half of the luminance signal, down conversion is carried out, by using the equation (7) for the chrominance signal, and by using the equation (6) for the luminance signal. Finally, as shown in FIG. 3, the down converted field unit pels are stored in the external memory 12.

Figure 10:
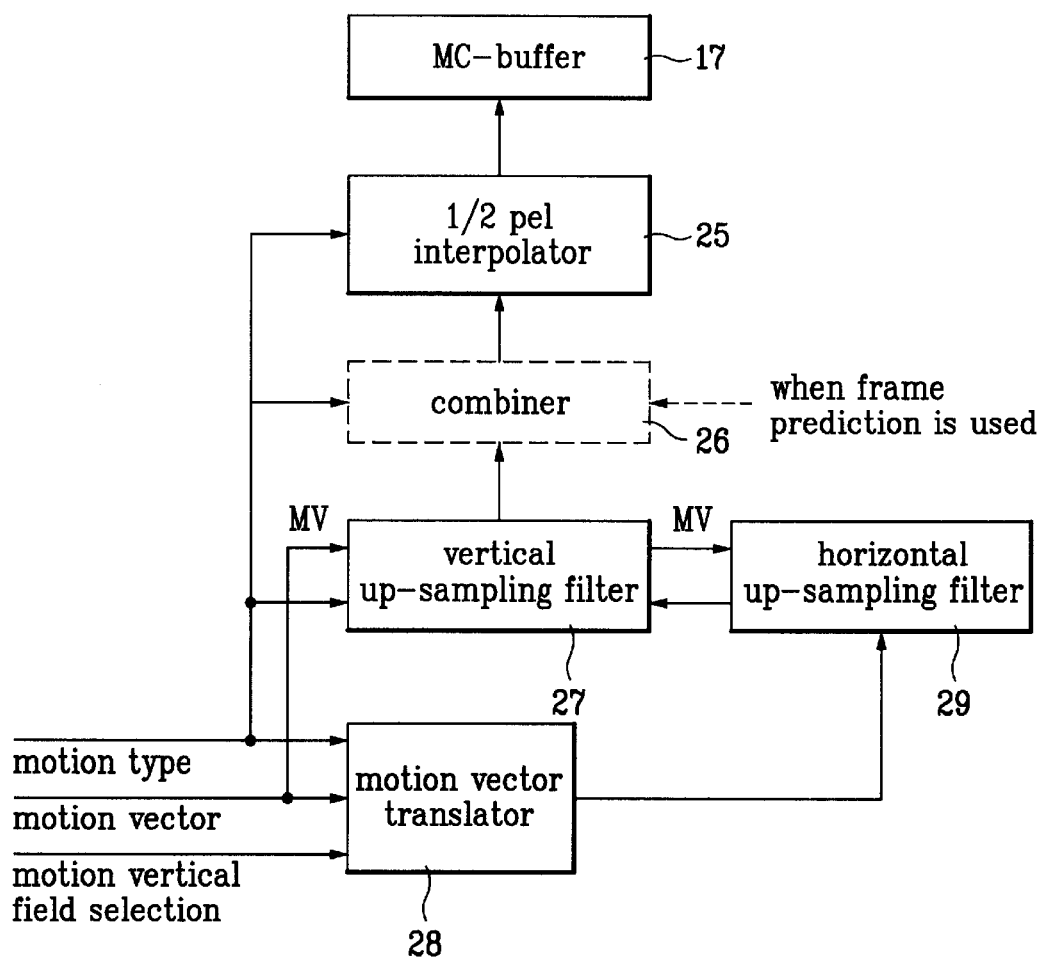
FIG. 10 illustrates detailed systems of the up sampler and the motion compensator in FIG. 2.

FIG. 10 illustrates detailed systems of the up sampler and the motion compensator in FIG. 2, showing a motion compensation for an up sampling.

Referring to FIG. 10, the motion compensator having up samplers includes a motion vector translator 28 for translating a motion type signal, a motion vector, and a motion vertical field selection signal from the VLD 3, to obtain a reference memory read address, and a reference pel for prediction, a horizontal up sampling filter 29 for making a horizontal up sampling by using the motion vector, the reference memory address, and the reference pels for prediction, a vertical up sampling filter 27 for making a vertical up sampling a data from the horizontal up sampling filter 29 by using the motion vector, and the motion type, a combiner 26 for combining up sampled field blocks from the vertical up sampling filter 27 into frame blocks when a frame prediction is used, and an 1/2 pel interpolator 25 for interpolating a data from the combiner 26 by 1/2 pels, and forwarding to the MC_buffer 17.

The operation of the video decoder for the foregoing motion compensation will be explained.

In a case of an intra picture, a result passed through the IDCT 5 in FIG. 2 is down sampled right away, and stored in the external memory 12. On the other hand, a prediction picture 'P' or a bi-directional picture 'B' is added to motion prediction compensated blocks, and stored in the external memory 12. On the other hand, in order to obtain a motion compensated frame, a video encoder in a transmission side reproduces the present frame block from a prior frame by using a motion vector MV of a perfect resolution. Therefore, for enhancing a picture quality, the present invention uses the motion vector of a perfect resolution as it is, rather than scaling down the vertical and horizontal motion vectors. At first, for using the motion vector MV of a perfect resolution, it is required to up sample a reference picture of a reduced resolution stored in the external memory 12 to a picture of an original resolution.

As explained, the external memory 12 in FIG. 2 has field based vertical structure pictures stored therein. In the MPEG video, there are a frame prediction and field prediction according to motion types. In the field prediction, an up sampling is made for fields selected in response to a motion vertical field selection signal motion_vertical_field_select. However, in a case of the frame prediction, after the top field and the bottom field are up sampled respectively, one frame block is provided from two up sampled fields. Then, a frame predicted block is provided and 1/2 pel prediction is carried out.

Figure 11:
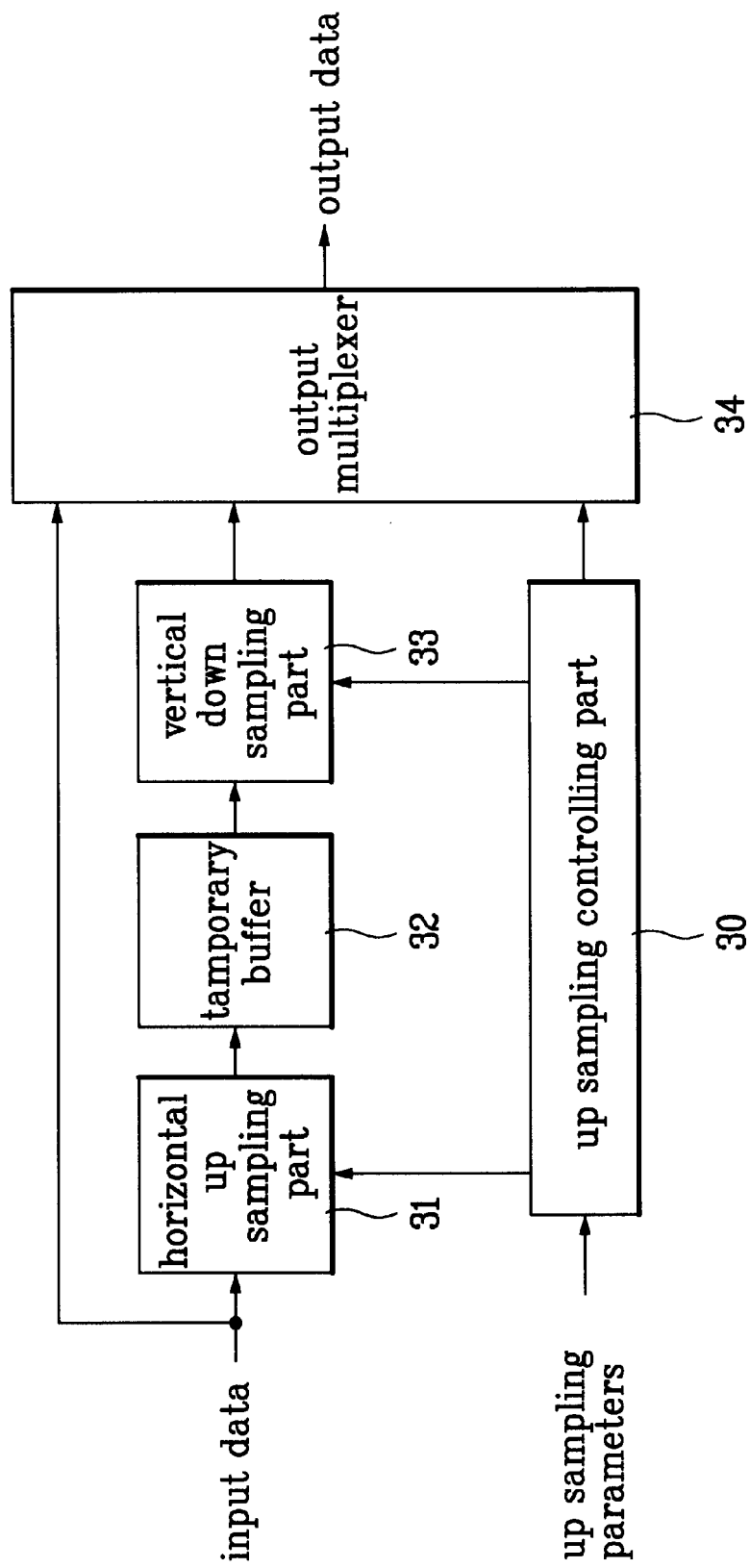
FIG. 11 illustrates a detailed system of the up sampler 9 in FIG. 2.

In this instance, a picture quality is greatly dependent on characteristics of the up sampling filter. The up sampling filter type used in the present invention, a reverse type of the foregoing down sampling type, uses a matrix of the DCT bases. FIG. 11 illustrates a detailed system of the up sampler 9 in FIG. 2.

Referring to FIG. 11, the up sampler 9 includes an up sampling controlling part 30 for controlling up sampling according to received up sampling parameters, a horizontal up sampling part 31 for subjecting a received data to horizontal up sampling under the control of the up sampling controlling part 30, a temporary buffer 32 for temporary storage of the horizontal up sampled data, a vertical up sampling part 33 for subjecting a data from the temporary buffer 32 to vertical up sampling under the control of the up sampling controlling part 30, and a forwarding multiplexer 34 for forwarding either the received data or a data from the vertical up sampling part 33 under the control of the up sampling controlling part 31, selectively. As shown in FIG. 11, alike the down sampler, the up sampler adjusts extents of vertical and horizontal up sampling according to unity, 1/2, or 3/4 reduction mode. For an example, in the 1/2 reduction mode, only horizontal up sampling is made, and in the 3/4 reduction mode, both vertical and horizontal up sampling are made.

Above up sampling, reversal of the equation (6), converts four pels into 8 pels by using the following equations. At first, upon obtaining DCT coefficients for four pels, and making all DCT coefficients to be '0' for the rest of high frequencies, the following equation is obtained.

$$X_{[8\times 1]}^{1} = \begin{bmatrix} T4 \\ \phi \end{bmatrix} \cdot \sqrt{2} \cdot y_{4\times 1} = C_4 \cdot y_{4\times 1} \cdot 2 \quad (8)$$

A result of conduction of an 8-point IDCT according to the equation (8) can be expressed in the following equation (9).

$$X_{[8\times 1]}^{UP} = T8^T \cdot X_{[8\times 1]}^{1} \quad (9)$$

At the end, equations (8) and (9) can be expressed as the following equation (10).

$$X_{[8\times 1]}^{UP} = T8^T \cdot C_4 \cdot y_{4\times 1} \cdot 2 = 2 \cdot C_{4\times 8}^T \cdot y_{4\times 1} \quad (10)$$

Above equation (10) represents a process for up sampling a picture with a 1/2 resolution stored in the memory 2. A process for up sampling from the down sampled pel explained in the equation (7) to four pels can be expressed in the following equation (11).

$$X_{[4\times 1]}^{UP} = T4^T \cdot C_2 \cdot y_{2\times 1} \cdot 2 = 2 \cdot C_{2\times 4}^T \cdot y_{2\times 1} \quad (11)$$

FIG. 12 illustrates a block diagram showing a process for up sampling field data stored in a field basis external memory by means of frame prediction.

Referring to FIG. 12, a luminance signal and a chrominance signal are up sampled, separately. At first, up sampling of the luminance signal will be explained. A data from the field structure memory 12 is up sampling filtered by using the up sampling matrix, to obtain an up sampled top field and bottom field, which are added together. The added data is 1/2 pel predicted, and forwarded to the macro block adder 7 in FIG. 2. Next, up sampling of a chrominance signal will be explained. A data from the field structure memory 12 is up sampling filtered by using the up sampling matrix in the equation (11), to obtain an up sampled top field and bottom field respectively, which are added together. The added data is 1/2 pel predicted and forwarded to the macro block adder 7 in FIG. 2. In other words, the data from the field structure memory 12 is reproduced into a macro block in conformity to original resolution in vertical and horizontal directions, and a motion compensation block is obtained from this reproduced block. Alike the down sampling, the vertical up sampling of the chrominance signal is carried out by using the matrix in the equation (11). Particularly in the case of 75% memory reduction, if a 1/2 pel interpolation presents in vertical and horizontal directions, or a motion vector MV of a perfect resolution is not an exact multiple of 8, adjacent 4×4 unit blocks in vertical and horizontal directions are taken for motion compensation.

Figure 13:
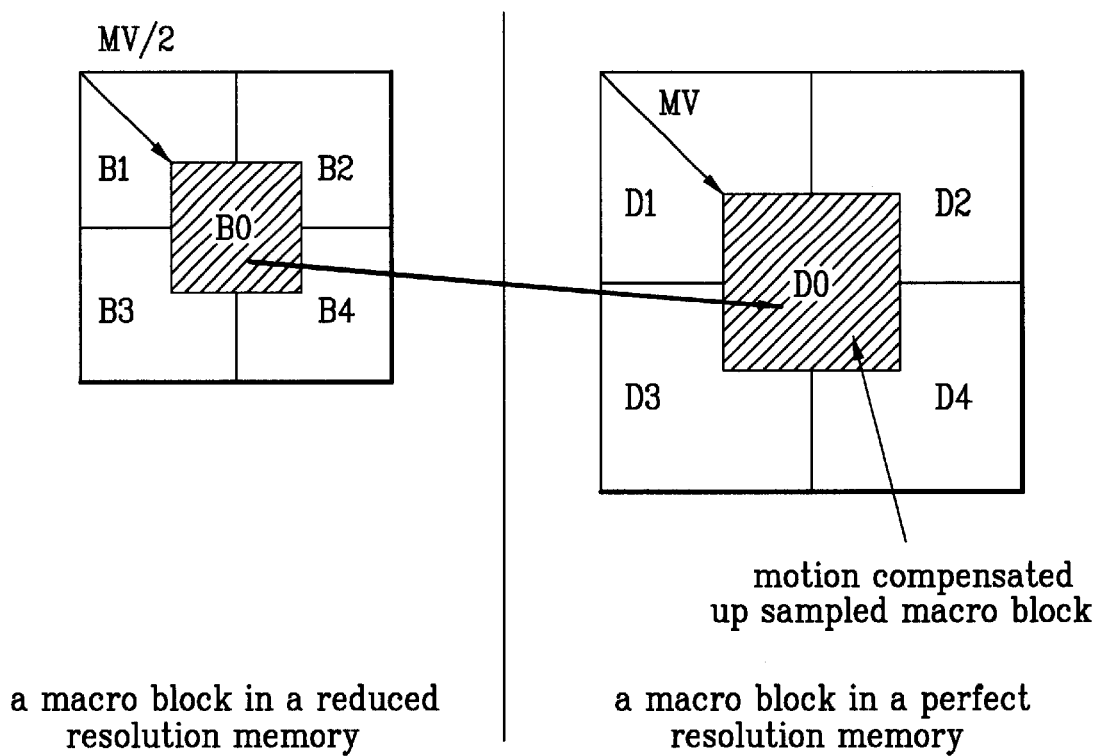

FIG. 13 illustrates a diagram for explaining a method for making motion compensation having 1/2 pel interpolation of the present invention.

Referring to FIG. 13, in order to produce a macro block D0 of an original picture from a memory of a reduced resolution, blocks B1, B2, B3, and B4 adjoining to a macro block B0 of a reduced resolution are taken. Then, blocks D1, D2, D3, and D4 of perfect resolutions in vertical and horizontal directions are restored from the blocks B1, B2, B3, and B4 by using the up sampling matrices derived in the equations (10) and (11). A 1/2 pel interpolation is carried out for area D0 of a motion vector MV of perfect resolution, to obtain a desired motion compensated block. When a 50% memory reduction is desired, if no 1/2 pel interpolation is present in a horizontal direction, or a horizontal motion vector MV of a perfect resolution is not an exact multiple of 8, adjoining blocks in a horizontal direction are taken, and up sampled by using the equation (10), and a 1/2 pel interpolation is carried out.

Blocks motion compensated according to the foregoing process is down sampled at the down sampler, and stored in the external memory 12, again. Then, the stored data is displayed on a display through the video display processor.

As has been explained, the video decoder with a down conversion function, and the method for decoding a video signal have the following advantages.

First, the scaleable video decoder of an HD class MPEG sequence of the present invention can reduce memory capacity by 50% or 75% effectively while a picture quality is maintained.

Second, the implementation of a video decoder for PIP (Picture In Picture) or low resolution display is very easy.

Third, a plurality of HD class video signals and a plurality of SD class video signals can be displayed on one screen by employing a memory of a capacity for processing one HD class video signal only.

Fourth, an HD class video signal can be displayed on a display of a low resolution without any additional expense for hardware.

Fifth, as an essential source technology in application fields of digital TV broadcasting and video conference, implementation of a high performance video that can make multi-decoding or process a plurality of pictures is possible.

It will be apparent to those skilled in the art that various modifications and variations can be made in the video decoder with a down conversion function, and a method for decoding a video signal of the present invention without departing from the spirit or scope of the invention. Thus, it is intended that the present invention cover the modifications and variations of this invention provided they come within the scope of the appended claims and their equivalents.

What is claimed is:

1. A video decoder comprising:
    a VLD for analyzing a received compressed bitstream;
    an IQ for inverse quantizing the bitstream analyzed at the VLD;
    an IDCT for inverse discrete cosine transform of a data from the IQ in macro block units;
    an MC for making motion compensation of a data up sampled by using motion vectors, a motion type, and a motion vertical field selection signal extracted at the VLD;
    a DCT buffer for separating a data from the IDCT into a top field data and a bottom field data by using a DCT type signal, a picture structure signal, and a progressive sequence signal extracted at the VLD;
    an MC buffer for separating a data from the MC into a top field data and a bottom field data by using the DCT type signal, the picture structure signal, and the progressive sequence signal;
    a first adder for adding the top field data from the DCT buffer and the top field data from the MC;
    a second adder for adding the bottom field data from the DCT buffer and the bottom field data from the MC;
    an adaptive down sampler for subjecting added top field data and added bottom field data from above two adders to adaptive down sampling, and storing in an external memory; and,
    an adaptive up sampler for up sampling a down sampled data stored in the external memory and providing to the MC.

2. A video decoder as claimed in claim 1, wherein each of the macro block units is an 8×8 block unit.

3. A video decoder as claimed in claim 1, wherein the down sampler includes:
    a down sampling controlling part for controlling down sampling according to received down sampling parameters,
    a vertical down sampling part for down sampling a received data in a vertical direction on a data from the adders under the control of the down sampling controlling part,
    a temporary buffer for temporary storage of the vertical down sampled data,
    a horizontal down sampling part for down sampling a data from the temporary buffer in a horizontal direction under the control of the down sampling controlling part, and
    a forwarding multiplexer for forwarding either of the received data and a data from the horizontal down sampling part selectively under the control of the down sampling controlling part.

4. A video decoder as claimed in claim 3, wherein the down sampler reduces each field data from the adders by one of reduction ratios selected from unity, 1/2, and 3/4.

5. A video decoder as claimed in claim 4 wherein the down sampler carries out down sampling only in a horizontal direction when the down sampler reduces an original data by the 1/2 reduction ratio.

6. A video decoder as claimed in claim 1, wherein the MC and the up sampler includes:
    a motion vector translator for translating a motion type signal, a motion vector, and a motion vertical field selection signal from the VLD, to obtain a reference memory read address, and a reference pel for prediction,
    a horizontal up sampling filter for making a horizontal up sampling by using the motion vector, the reference memory read address, and the reference pel for prediction,
    a vertical up sampling filter for making a vertical up sampling a data from the horizontal up sampling filter by using the motion vector, and the motion type,
    a combiner for combining up sampled field blocks from the vertical up sampling filter into up sampled frame blocks when a frame prediction is used, and
    an 1/2 pel interpolator for interpolating a data from the combiner by 1/2 pels, and forwarding to the MC_buffer.

7. A video decoder as claimed in claim 1, wherein, when the received bitstream is an intra picture, data from the IDCT is stored in the external memory right away after the data is down sampled.

8. A video decoder as claimed in claim 1, wherein the up sampler includes:
    an up sampling controlling part for controlling up sampling according to received up sampling parameters,
    a horizontal up sampling part for subjecting a data accessed from the external memory to horizontal up sampling under the control of the up sampling controlling part,
    a temporary buffer for temporary storage of the horizontal up sampled data,
    a vertical up sampling part for subjecting a data from the temporary buffer to vertical up sampling under the control of the up sampling controlling part, and
    a forwarding multiplexer for forwarding either the data access by the external memory or a data from the vertical up sampling part under the control of the up sampling controlling part, selectively.

9. A video decoder as claimed in claim 8, wherein the up sampler adjusts extents of up sampling in horizontal and vertical directions according to unity, 1/2, or 3/4 reduction mode.

10. A video decoder as claimed in claim 9, wherein the up sampler carries out up sampling only in a horizontal direction in the 1/2 reduction mode, and in vertical and horizontal directions in the 3/4 reduction mode.

11. A video decoder as claimed in claim 9, wherein, when $C_{4\times8}^T$ denotes a 4×8 dimension down sampling transposed matrix, and $y_{4\times1}$ denotes a down sampling pel value, the up sampler of a luminance carries out up sampling by carrying out $2 \cdot C_{4\times8}^T \cdot y_{4\times1}$, and, when $y_{2\times1}$ denotes a down sampled 2×1 pels, and $C_{2\times4}$ denotes a down sampling matrix of 2×4 dimension, the up sampler of chrominance carries out up sampling by carrying out $X_{[4\times1]}^{UP} = 2 \cdot C_{2\times4} \cdot y_{2\times1}$.

* * * * *